US007778768B2

(12) United States Patent
Barry et al.

(10) Patent No.: US 7,778,768 B2
(45) Date of Patent: Aug. 17, 2010

(54) REDUCING AIRPORT DELAYS USING PASSIVE RADAR INFORMATION AND ANALYTICS

(75) Inventors: James Barry, Madison, CT (US); James Cole, East Setauket, NY (US); Thomas O'Halloran, Gaylordsville, CT (US)

(73) Assignee: PASSUR Aerospace, Inc., Stamford, CT (US)

( * ) Notice: Subject to any disclaimer, the term of this patent is extended or adjusted under 35 U.S.C. 154(b) by 800 days.

(21) Appl. No.: 11/672,821

(22) Filed: Feb. 8, 2007

(65) Prior Publication Data

US 2007/0198170 A1 Aug. 23, 2007

Related U.S. Application Data

(60) Provisional application No. 60/771,730, filed on Feb. 9, 2006.

(51) Int. Cl.
*G01S 3/02* (2006.01)
*G06G 7/76* (2006.01)

(52) U.S. Cl. ........................ 701/120; 701/223; 342/454

(58) Field of Classification Search ................ 701/120, 701/117, 223; 342/454, 455, 426, 450; 707/1, 707/10, 102, 5; 340/945
See application file for complete search history.

(56) References Cited

U.S. PATENT DOCUMENTS

| | | | | |
|---|---|---|---|---|
| 5,596,326 | A * | 1/1997 | Fitts | 342/30 |
| 7,123,192 | B2 * | 10/2006 | Smith et al. | 342/455 |
| 7,423,590 | B2 * | 9/2008 | Smith | 342/450 |
| 2003/0195693 | A1 * | 10/2003 | Flynn et al. | 701/120 |
| 2004/0044463 | A1 * | 3/2004 | Shen-Feng et al. | 701/120 |

* cited by examiner

*Primary Examiner*—Tan Q Nguyen
(74) *Attorney, Agent, or Firm*—Fay Kaplun & Marcin, LLP

(57) ABSTRACT

A system and method for reducing airport delays using passive radar information and analytics. The system includes (a) a data receiving arrangement receiving, from a data source, at least one type of information for a plurality of aircraft; (b) a data processing arrangement calculating efficiency data based on the received information; and (c) a data distribution arrangement organizing efficiency data into a displayable file and distribute the file to users of the system.

21 Claims, 3 Drawing Sheets

System 1

REDUCING AIRPORT DELAYS USING PASSIVE RADAR INFORMATION AND ANALYTICS

PRIORITY CLAIM/INCORPORATION BY REFERENCE

This application claims the benefit of U.S. Provisional Patent Application No. 60/771,730 filed on Feb. 9, 2006 and entitled "Reducing Airport Delays Using Passive Radar Information And Analytics" and is expressly incorporated herein, in its entirety, by reference.

BACKGROUND INFORMATION

The ability of airlines to operate profitably depends, in large part, on efficient utilization of resources such as aircraft, personnel, and access to runways and other airport facilities. The smoothness and speed of the flow of air traffic in and around an airport, particularly relating to the ability to predict and reduce delays, is a significant factor contributing to such efficiency. By maintaining traffic flow at or near optimal conditions, fuel consumption may be minimized; aircraft flight time may be reduced; and delays may be avoided, resulting in improved customer relations and enhanced prospects for repeat business.

Airlines are generally able to monitor their own internal operations to ensure efficiency. However, they do not typically have the ability to monitor airport operations on a broader scale in order to analyze and act on delays. Therefore, if airlines were able to access improved information, they could better communicate with air traffic control ("ATC") in order to improve airport throughput, reduce delays, and improve the efficiency of their operations.

SUMMARY OF THE INVENTION

The present invention relates to a system and method for reducing airport delays using passive radar information and analytics. The system includes (a) a data receiving arrangement receiving, from a data source, at least one type of information for a plurality of aircraft; (b) a data processing arrangement calculating efficiency data based on the received information; and (c) a data distribution arrangement organizing efficiency data into a displayable file and distribute the file to users of the system.

DETAILED DESCRIPTION

Figure 1:
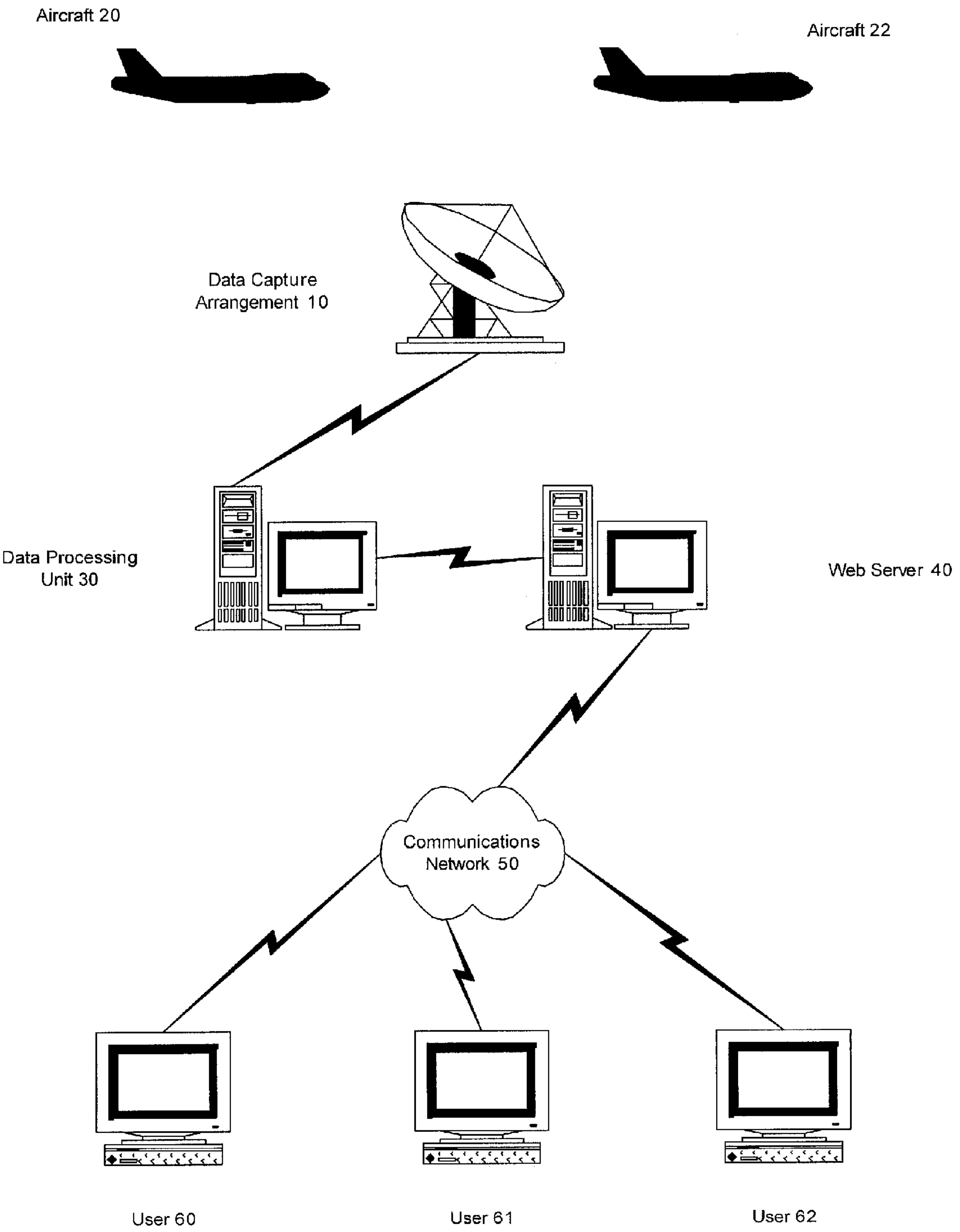
FIG. 1 shows an exemplary system for determining airport efficiency data according to the present invention.

The exemplary embodiments of the present invention provide an airport efficiency monitoring system for delivery of information via a communication network which may be, for example, the Internet, a corporate intranet, etc. The information that is provided to the users (e.g., via a graphical user interface such as a World Wide Web browser) may include various metrics of airport efficiency to be discussed below, as well as measured aircraft performance data used to calculate these results. The exemplary embodiments of the present invention are described as a web based system; however, those skilled in the art will understand that there may be any number of other manners of implementing the present invention in embodiments that are not web based. The present invention may be further understood with reference to the following description and the appended drawings, wherein like elements are referred to with the same reference numerals.

FIG. 1 illustrates an exemplary system 1 according to the present invention. A data capture arrangement 10 obtains data relating to the operation of a plurality of aircraft 20, 22. In this exemplary embodiment, the data capture arrangement 10 may include one or more Passive Secondary Surveillance Radar ("PSSR") systems. A PSSR system may be, for example, the PASSUR® system sold by Megadata Corporation of Bohemia, N.Y. Data collected by the data capture arrangement 10 may include, but is not limited to, VFR/IFR conditions, type of arriving and/or departing aircraft, separation distance between arriving and departing aircraft, arrival rate of arriving and/or departing aircraft, time from an outer boundary to landing, aircraft speed at a plurality of points during arrival and/or departure, actual airport runway configuration, location of base leg turns, and location of "stream blending" for arriving aircraft.

With the exception of many small airports that serve general aviation, larger airports generally have a Secondary Surveillance Radar ("SSR") system. SSR includes a rotating radar that sends interrogation signals at a frequency of 1030 MHz to aircraft in the vicinity of the airport. Transponders aboard aircraft respond to the interrogations by transmitting a response signal back to the radar at a frequency of 1090 MHz. In addition to the SSR, PSSR may be sited near, but not on, the airport grounds. PSSR may include two antenna systems: a fixed, directional high gain 1030 MHz antenna aimed toward the SSR for receiving the interrogation signals; and a stationary array of directive antennas arranged in a circle to detect the 1090 MHz responses from the aircraft transponders. PSSR's may be placed at known distances and directions from a corresponding SSR.

Using the time relationships between received signals, i.e., the interrogations and responses, the known distances from the SSR, and the known direction from each PSSR to the SSR, the PSSR determines the location of aircraft relative to a reference location, e.g., the airport. Response signals from the aircraft received by PSSR include Mode A transponder beacon signals, Mode C transponder beacon signals and Mode S transponder beacon signals. The Mode A signal comprises a four (4) digit code which is the beacon code identification for the aircraft. The Mode C signal additionally includes altitude data for the aircraft. The Mode S signal is either a 56 bit surveillance format having a 32 bit data/command field and a 24 bit address/parity field or a 112-bit format allow for the transmission of additional data in a larger data/command field. PSSR receives the beacon code and altitude data from the received signals and calculates aircraft position (e.g., range, azimuth) and ground speed based on the timing of the receipt of the signals and the known radar locations. Thus, position information or target data points for each of the aircraft is derived based on the physical characteristics of the incoming signals, rather than based on position data contained in the signal itself.

The data capture arrangement 10 conveys some or all of the recorded data to a processing unit 30. The processing unit 30 may be, for example, a standard PC based server system running an operating system such as LINUX. Those skilled in the art will understand that any computing platform may be used for the processing unit 30. The processing unit 30 analyzes the raw data from the data capture arrangement to determine one or more results requested by users 60-62.

In one exemplary embodiment, the data collected by the passive radar is used to calculate efficiency data of an average separation between arriving aircraft by observing the physical distance between aircraft in the approach path. That is, the passive radar collects data that gives the position (e.g., x,y,z coordinates) of each plane that is being monitored. This data may be used to calculate the physical distance at any point time between aircraft being monitored. Such distances may be averaged over discrete periods of time (e.g., hours, days, etc.) and may then be compared to the average separation from previous days, months, etc. In one exemplary embodiment, the comparing to previous periods is performed for periods having similar conditions (e.g., weather conditions, days of the week, holiday/non-holiday, etc.). If the average separation during a given period of time is greater than the average separation during a similar period of time in the past (or, alternately, if the average separation is greater than the separation required for safe flight under current weather conditions), then the airport is not maximizing its throughput. An airline with detailed knowledge of this type will be better informed when negotiating with ATC for landing/takeoff slots, and will thus be able to help improve efficiency. This type of information that may be derived from the passive radar data allows the airline to effectively collaborate with the ATC, the airport and the FAA because the airline has the information providing insight into the current conditions of airport efficiency and how this compare to pas performance.

Another type of efficiency data that may be determined from the passive data is an aircraft arrival rate. This is obtained by measuring the number of aircraft that arrive over a given period of time. The present arrival rate may then be compared with either previous measured arrival rates (as above, ideally from periods with similar conditions), or with the projected arrival rate based on arrival schedules. If the present arrival rate is lower than projected, an airline is better able to anticipate delays, and may also be able to contact ATC to obtain an explanation for the lower arrival rate and/or request an increase.

For example, if the airline understands that the present arrival rate is less than the projected arrival rate based on the schedule, the airline may be able to determine delays and inform passengers. The airline may also provide for anticipatory delays, e.g., because of a slow arrival rate, the airline may determine that flights that are scheduled several hours out may experience delays, and therefore be able to keep passengers better informed. It should be noted that the exemplary embodiments of the present invention may be able to determine the delays. For example, based on the actual arrival rate, the exemplary embodiments may adjust the arrival/departure schedule times.

In another example, the airline may be able to determine, based on the current arrival rate and historical arrival rates, exactly how the schedule will be affected. That is, the exemplary embodiments may compare a historical time period having a similar arrival rate for which all the data is known (e.g., arrival times, delays, etc.) to the current arrival rate to approximate what will happen in the present/future. However, not only can the airline anticipate any issues in order to inform passengers, but the airline can also use this information to interact with the ATC, airport, FAA, etc. in order to take corrective action to mitigate any adverse effects of the particular identified inefficiency.

In another example, another type of efficiency data that may be determined is an elapsed time from an outer boundary to landing. Once again, the passive data may indicate when each aircraft passes an outer boundary and when the aircraft lands, thereby allowing a calculation of the elapsed time for the traversal from the outer boundary to the runway in use. To provide accurate efficiency data, the elapsed time efficiency data may be sorted by, for example, aircraft type, runway, weather conditions, etc. Once again, this current data may then be compared to historical averages under similar conditions, thereby indicating if there is any current inefficiency that may be corrected.

Aircraft speed at various points during arrival/departure is another type of efficiency data that may be determined. Points of interest may include an outer boundary, a fixed point in the takeoff/landing flight path, and a threshold point just before landing, etc. Similar to the previous types of efficiency data, if aircraft are passing these points at speeds that are too slow (given the type of aircraft and the weather conditions), the airport is running inefficiently and throughput is not being maximized. This data may be passed on to the ATC so that the ATC may indicate to pilots that they may increase their airspeed at the various points in order to increase efficiency by allowing additional planes to takeoff/land.

Another example of efficiency data that may be determined is information regarding actual airport runway configuration. As described above, the collected passive data will include the physical location of the aircraft. This physical location may be correlated with the location of runways to determine the runway on which an aircraft takes off or lands. This may then be compared to the planned runway configuration in view of weather, time of day, etc. Such a comparison may show, for example, that ATC is underutilizing one runway in favor of another. When an airline becomes aware of configuration changes, it can contact ATC to obtain an explanation and/or request a change back to an optimal runway configuration.

Figure 2:
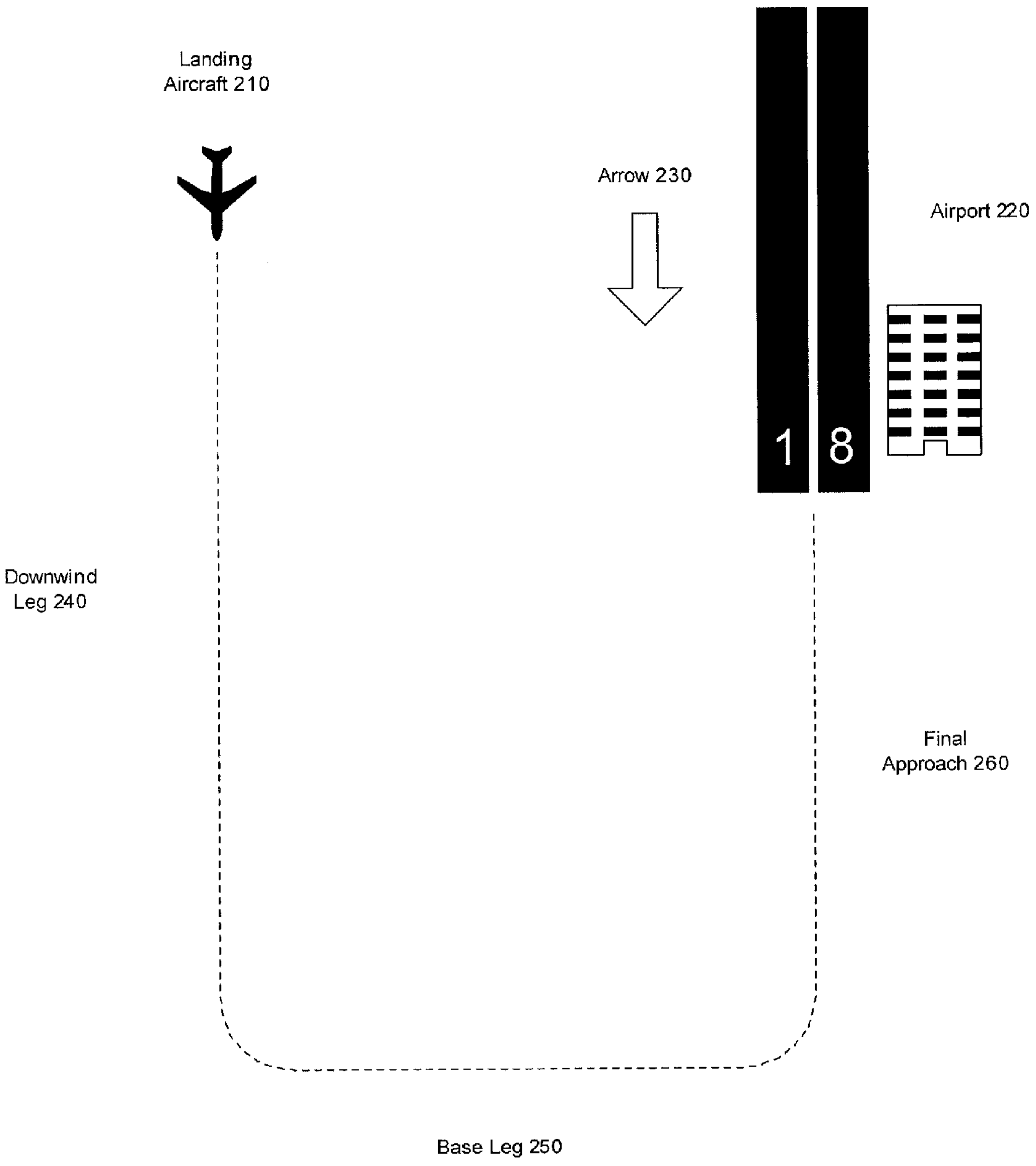
FIG. 2 shows a simplified exemplary view of a typical route an aircraft takes to approach an airport.

Another example of efficiency data that may be determined is the location of base leg turns. FIG. 2 shows a typical flight path followed by a landing aircraft 210 when approaching airport 220 for landing, with the prevailing wind blowing in the direction indicated by arrow 230. Landing aircraft 210 travels with the wind along downwind leg 240, turns into crosswind base leg 250, and then turns into the wind for final approach 260. Base leg 250 must be located sufficiently downwind from airport 220 in order for the pilot of landing aircraft 210 to make a safe and controlled approach. The proper position for base leg 250 is dependent on, among other factors, the model of airplane 100 and the weather conditions at the time of landing. If the pilot of landing aircraft 210 turns into base leg 250 too far downwind, however, the approach takes more time, resulting in increased fuel consumption and diminished airport throughput. Therefore, by monitoring the location of base leg turns, an airline can optimize its own fuel consumption, and can inform the ATC if other airlines are operating in a manner that may result in diminished throughput.

Another type of efficiency data that may be determined is a variance between actual time of arrival and estimated time of arrival from one or more fixed points along an arrival path. By observing such speed variances, airlines may become aware of possible "surges" and may communicate with ATC to request that arrival speeds be smoothed. This can result in increased fuel efficiency.

Another example of efficiency data that may be determined is the location where stream blending is taking place among arriving aircraft. When approaching an airport for landing, multiple aircraft will follow the same approach path (e.g., the path shown in FIG. 2), separated by at least a minimum safe distance. One reason for this is to minimize the effect that one aircraft's jet stream will have on other aircraft. Aircraft following similar paths will create similar jet streams; the process of merging approaching aircraft into such a similar path is known as "stream blending." Having predictable, blended streams created by approaching aircraft is desirable because it results in calmer, more predictable air conditions for both arriving and departing aircraft. However, at times stream blending occurs farther from the airport than is necessary. This can cause aircraft to fly a longer approach path in order to merge their streams further away from the airport. The result of these suboptimal trajectories is more time spent on approach, increased fuel usage, and delayed arrivals. Therefore, information about the location of stream blending may be useful for airlines to request that the ATC route traffic more efficiently.

It should be noted that the above examples of efficiency data are only exemplary and that other types of efficiency data may be determined using the collected passive radar data. Thus, efficiency data may be any data that may be calculated from the passive radar data or other data in combination with the passive radar data (e.g., active radar data, FAA data, fixed data such as schedules, runway locations, etc.) to determine how efficiently an airport, aircraft and/or airline is operating. This includes a combination of one or more of the efficiency metrics discussed above being used to create a composite metric for overall airport efficiency. Such a metric may be based on average aircraft separation and arrival rates, and could additionally consider aircraft type and weather conditions. By analyzing such a metric, an airline can learn whether the ATC has overperformed or underperformed, what an airport's true capacity is, how to schedule its flights optimally, and how to best collaborate with ATC and airport administration to improve efficiency.

It should also be noted that, while the preceding paragraphs describe efficiency data that may be calculated from measured information about arriving flights, many of the same metrics are equally applicable to departing flights. The results of such measurements may be used in substantially the same manner as data for arriving flights.

Once calculations are complete, the resulting data is delivered to the users 60-62 of the system 1. The data processing unit 30 may also include web server 40 software to distribute data to the users 60-62 of the system 1. In the exemplary embodiment of the system 1 shown in FIG. 1, the data generated by the data processing unit 30 may be transmitted to a plurality of users (e.g., users 60-62) via a communications network 50 (e.g., the Internet). The web server 40 software may host a web page containing the necessary data and information to display the tracking information by local users. The users 60-62 may operate a web browser such as Microsoft's Internet Explorer, Mozilla Firefox, or other third-party web browsing software which may access the web page hosted by web server 40 software. The web browser software operated by the users 60-62 will manage the data that is transmitted to the client users 60-62 from the web server 40 software of the data processing unit 30. The data transferred from the data processing unit 30 may be, for example, HTML code or applets.

Thus, when a user (e.g., users 60-62) connects to the data processing unit 30 via communications network 50, the web server 40 software may send an applet to the user to enable the user to display and control the data sent from the data processing unit 30 to the user. The applet code transferred to the user may be executed by the user's browser to display the tracking information. As the user remains connected to the data processing unit 30, the web server 40 software will continue to update the data on the user's screen. The update may be performed automatically each time the data processing unit 30 receives updated information from the data capture arrangement 10. Updates from PSSR sources may occur approximately every 4.6 seconds, i.e., the time that the data processing unit 30 receives updates from a PSSR source plus the processing and data transmission times. The data may be formatted by the data processing unit 30 and delivered to the web browser of the users 60-62 in any standard web browser readable format, for example, HTML format, Java, Java Script, etc.

Data sent from the data processing unit 30 to the users 60-62 via communications network 50 may be displayed in a variety of ways. For example, results may be displayed as absolute numbers (e.g., the actual airport arrival rate, displayed as bar graphs over time, with each bar representing a selected time interval). Alternately, actual results may be shown in comparison to projected results (e.g., actual arrival rate vs. projected arrival rate; such a display would put the actual number into an appropriate context for the user, who would then be better able to act on the information). As another option, information could be displayed in the form of live averages or historical averages (e.g., the average aircraft separation rate, both current and over a selected historical period; this would enable the user to be better informed when discussing an ongoing disruption with ATC). An additional display view would be to show data in the form of a bell curve (e.g., time from an outer marker to landing; such a display could be in the form of a numerical standard deviation from the mean, or a visual representation of a bell curve, making outliers easily identifiable). Finally, the results could be displayed in the form of an algorithm as a combination of many of the different variables. That is, the information could be delivered simply as an efficiency metric on, for example, a scale of 0-100 for any particular efficiency metric or a combination of efficiency metrics.

Figure 3:
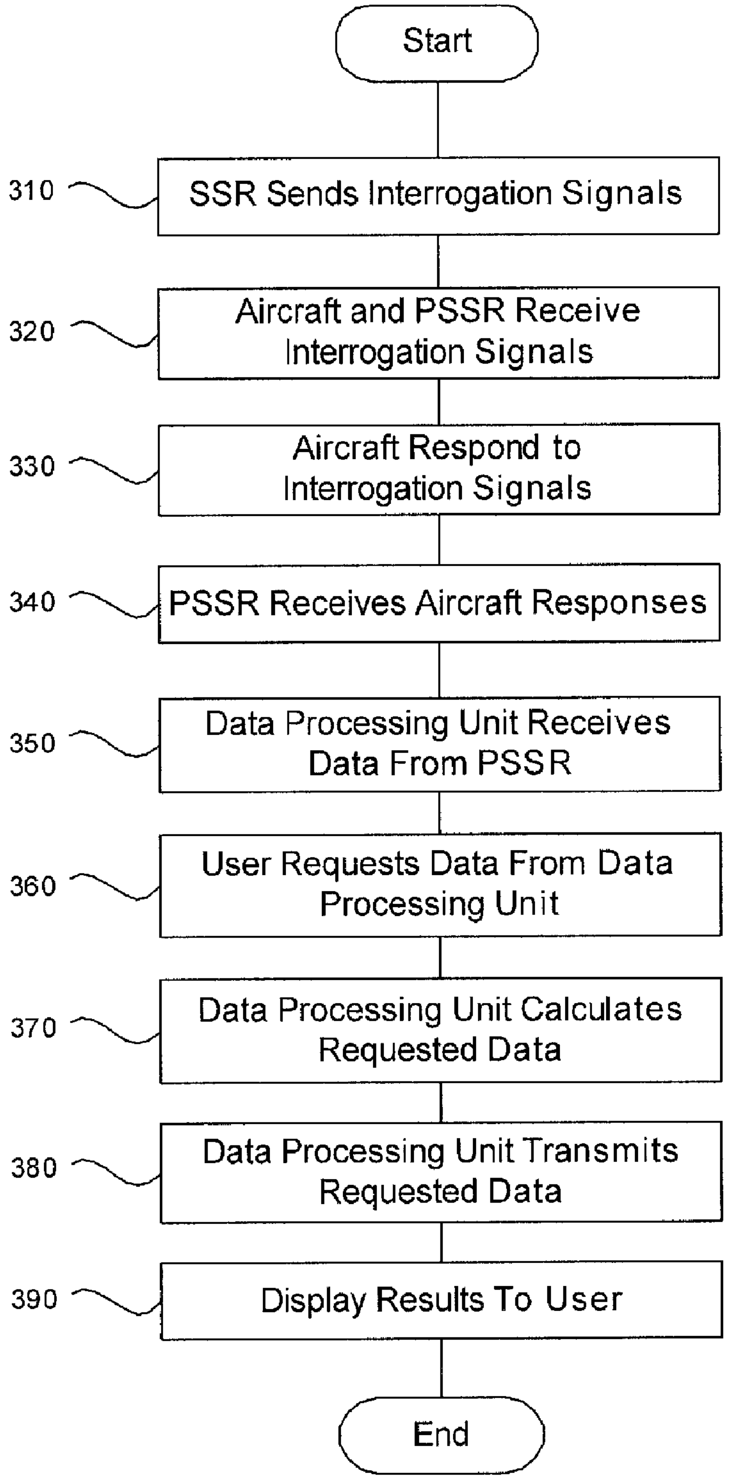
FIG. 3 shows an exemplary method for determining airport efficiency data according to the present invention

FIG. 3 illustrates an exemplary method 300 by which data is received, processed, and routed to the user. In step 310, the airport SSR sends interrogation signals to aircraft in the vicinity of the airport. In step 320, the interrogation signals are received by aircraft and by the PSSR. In step 330, aircraft reply to the interrogation signals. In step 340, the replies are received by the airport SSR and by the PSSR. In step 350, the interrogation signals and their replies are sent by the PSSR to the data processing unit. In step 360, the data processing unit receives a request for data from a user. In step 370, the data processing unit performs the calculations required to generate the requested data from the raw information received from the PSSR. In step 380, the data processing unit transmits the requested data to the user via a communications network. In step 390, the data is displayed to the user through a graphical user interface, such as those of the types described above.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:

a data receiving arrangement receiving, from a data source, at least one type of information for a plurality of aircraft;

a data processing arrangement calculating efficiency data based on the received information; and a data distribution arrangement organizing efficiency data into a displayable file and distribute the file to users of the system, wherein the efficiency data includes a location of stream blending during aircraft arrival.

2. The system of claim 1, wherein the data source is a passive radar system.

3. The system of claim 1, wherein the efficiency data includes one of an average distance between arriving aircraft, an arrival rate of arriving aircraft, an average time from an outer boundary to landing, an aircraft speed at different points during arrival, an actual airport runway configuration, a location of base leg turns, and speed variances at different points during arrival.

4. The system of claim 3, wherein the efficiency data includes at least two of the listed data types.

5. The system of claim 1, wherein the data receiving arrangement further receives a second type of information from a second data source, the efficiency data being calculated based on the received information and the second type of information.

6. The system of claim 5, wherein the second data source is one of an active radar system, an FAA data feed, a schedule data feed, an airline data feed, an air traffic control data feed and an airport data feed.

7. The system of claim 5, wherein the second type of information includes one of an airline schedule, a location of a runway, an expected runway configuration, an expected fuel usage, a type of aircraft and weather conditions.

8. The system of claim 1, further comprising:

a storage arrangement storing the calculated efficiency data, the stored efficiency data being historical efficiency data.

9. The system of claim 8, wherein the data processing arrangement compares the calculated efficiency data to the historical efficiency data.

10. The system of claim 1, wherein the displayable data includes one of a text display, a bar graph, a pie chart and a bell curve.

11. The system of claim 1, wherein the displayable data includes an alert indicating when the efficiency data varies from expected values by a threshold value.

12. A method, comprising:

receiving, from a data source, at least one type of information for a plurality of aircraft;

calculating efficiency data based on the received information; and distributing the efficiency data to users of the system, wherein the efficiency data includes a location of stream blending during aircraft arrival.

13. The method of claim 12, wherein the data source is a passive radar system.

14. The method of claim 12, wherein the efficiency data includes one of an average distance between arriving aircraft, an arrival rate of arriving aircraft, an average time from an outer boundary to landing, an aircraft speed at different points during arrival, an actual airport runway configuration, a location of base leg turns, and speed variances at different points during arrival.

15. The method of claim 12, further comprising:

receiving a second type of information from a second data source, the efficiency data being calculated based on the received information and the second type of information.

16. The method of claim 15, wherein the second data source is one of an active radar system, an FAA data feed, a schedule data feed, an airline data feed, an air traffic control data feed and an airport data feed.

17. The method of claim 15, wherein the second type of information includes one of an airline schedule, a location of a runway, an expected runway configuration, an expected fuel usage, a type of aircraft and weather conditions.

18. The method of claim 12, further comprising:

storing the calculated efficiency data, the stored efficiency data being historical efficiency data.

19. The method of claim 18, further comprising:

comparing the calculated efficiency data to the historical efficiency data.

20. The method of claim 12, further comprising:

alerting the user when the efficiency data varies from expected values by a threshold value.

21. A system comprising a computer-readable medium storing a set of instructions and a processor executing the instructions, the instructions being operable to:

receive, from a data source, at least one type of information for a plurality of aircraft;

calculate efficiency data based on the received information; and distribute the efficiency data to users of the system, wherein the efficiency data includes a location of stream blending during aircraft arrival.

* * * * *